United States Patent [19]

Kempf et al.

[11] Patent Number: 4,798,418
[45] Date of Patent: Jan. 17, 1989

[54] VEHICLE WHEEL

[75] Inventors: Helmut Kempf, Schaffhausen; Hans Kopp, Uhwiesen, both of Switzerland

[73] Assignee: Georg Fischer Aktiengesellschaft, Schaffhausen, Switzerland

[21] Appl. No.: 22,029

[22] Filed: Mar. 5, 1987

[30] Foreign Application Priority Data

Mar. 14, 1986 [CH] Switzerland ............ 1050/86

[51] Int. Cl.⁴ .................... B60B 21/00; B60B 21/10
[52] U.S. Cl. ................................ 301/31; 301/41 W; 301/63 R; 152/379.3; 152/380; 152/387
[58] Field of Search .............. 152/379.3, 379.4, 379.5, 152/380, 384, DIG. 20; 301/62, 63 R, 95, 96, 41 W

[56] References Cited

U.S. PATENT DOCUMENTS

| | | | |
|---|---|---|---|
| 528,451 | 10/1894 | Tillinghast | 152/379.3 |
| 936,008 | 10/1909 | Mérigoux | 152/379.3 |
| 1,118,122 | 11/1914 | Gish | 152/380 |
| 1,478,885 | 12/1923 | Brown | 152/387 |
| 2,078,191 | 4/1937 | Budd | |
| 3,774,970 | 11/1973 | Murphy et al. | 301/41 W |
| 3,965,957 | 6/1976 | Nakasaki | 152/379.3 |
| 4,630,662 | 12/1986 | Howind | 152/DIG. 20 |
| 4,662,418 | 5/1987 | Janus | 152/387 |

FOREIGN PATENT DOCUMENTS

| | | | |
|---|---|---|---|
| 484115 | 10/1929 | Fed. Rep. of Germany | 152/379.3 |
| 1164257 | 2/1964 | Fed. Rep. of Germany | |
| 2937272 | 3/1980 | Fed. Rep. of Germany | |
| 3410048 | 9/1985 | Fed. Rep. of Germany | |
| 3531177 | 3/1987 | Fed. Rep. of Germany | 152/380 |
| 1177513 | 4/1959 | France | 301/63 R |
| 324960 | 11/1957 | Switzerland | |
| 444692 | 2/1968 | Switzerland | |

*Primary Examiner*—James B. Marbert
*Attorney, Agent, or Firm*—Werner W. Kleeman

[57] ABSTRACT

The vehicle wheel comprises a rim containing an external closed ring and an internal rim ring composed of three segments and connected to a segmentally separated or segment-shaped divided disc. The beads of the pneumatic tire lie in grooves disposed between the external closed ring and the internal rim ring. Each of these grooves is formed by a bead seat, a vertical web and the external closed ring. Due to the internal pressure of the air in the pneumatic tire, each tire bead is drawn against clamping surfaces of the associated groove and sealed in relation to the external closed ring.

14 Claims, 3 Drawing Sheets

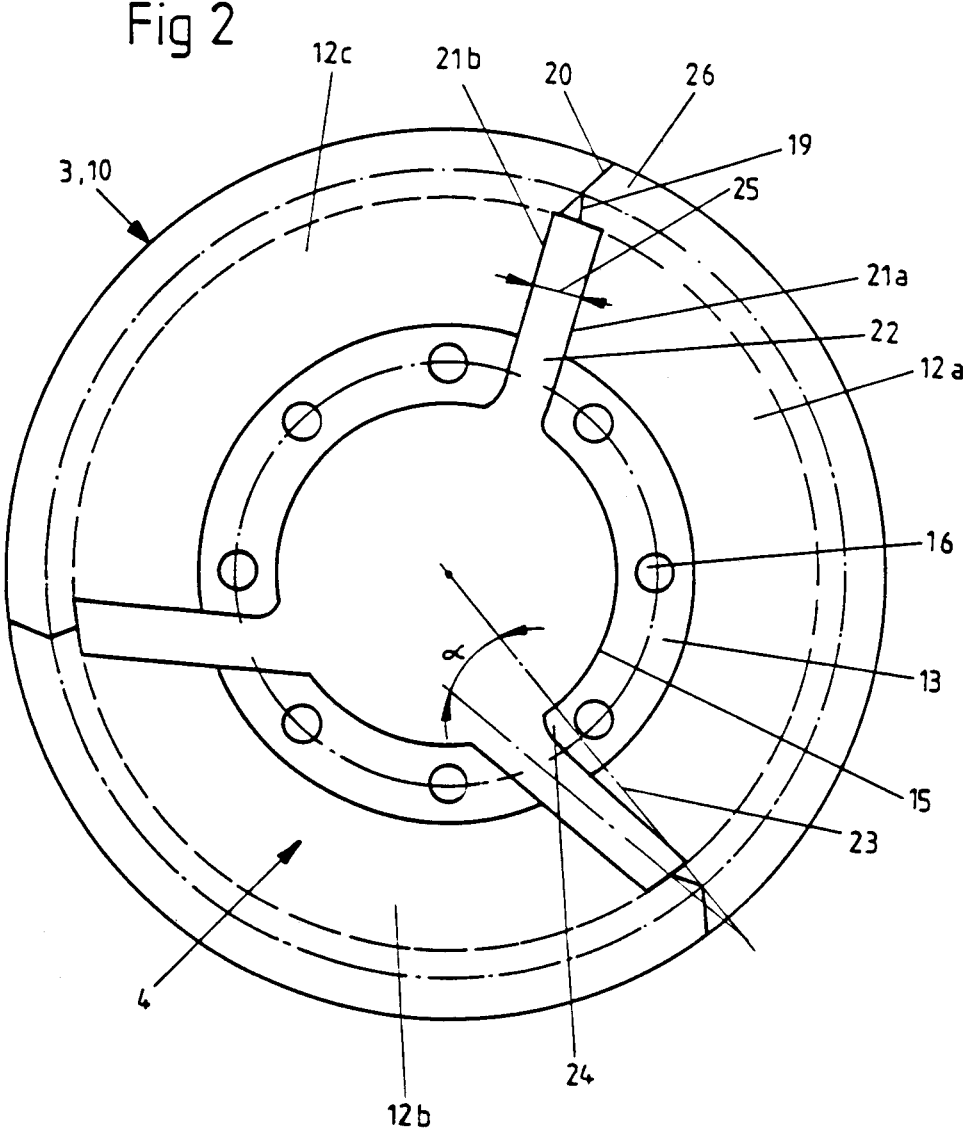

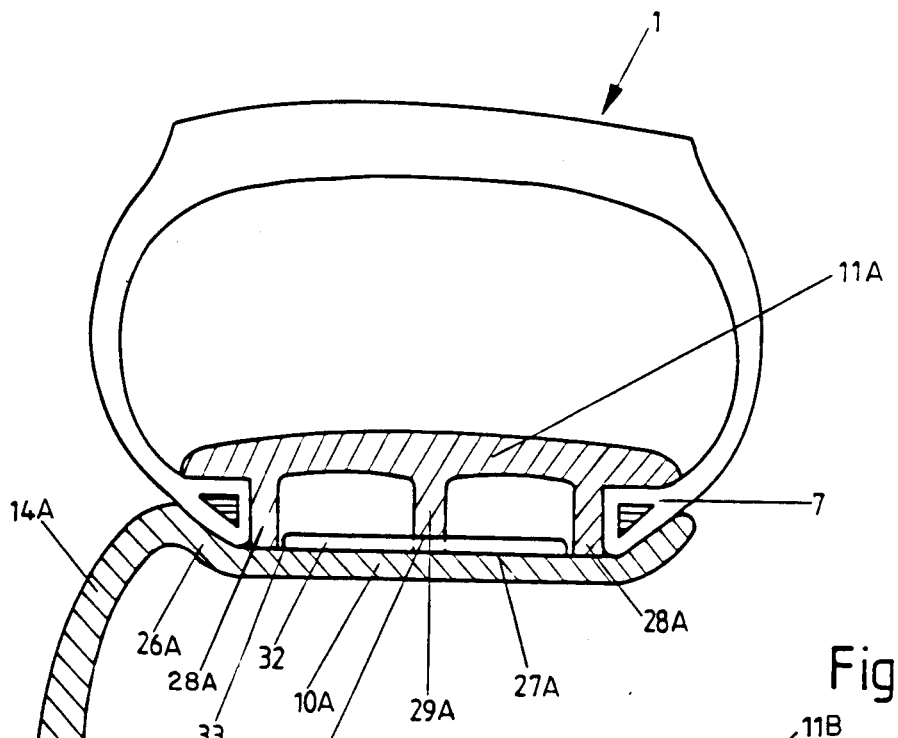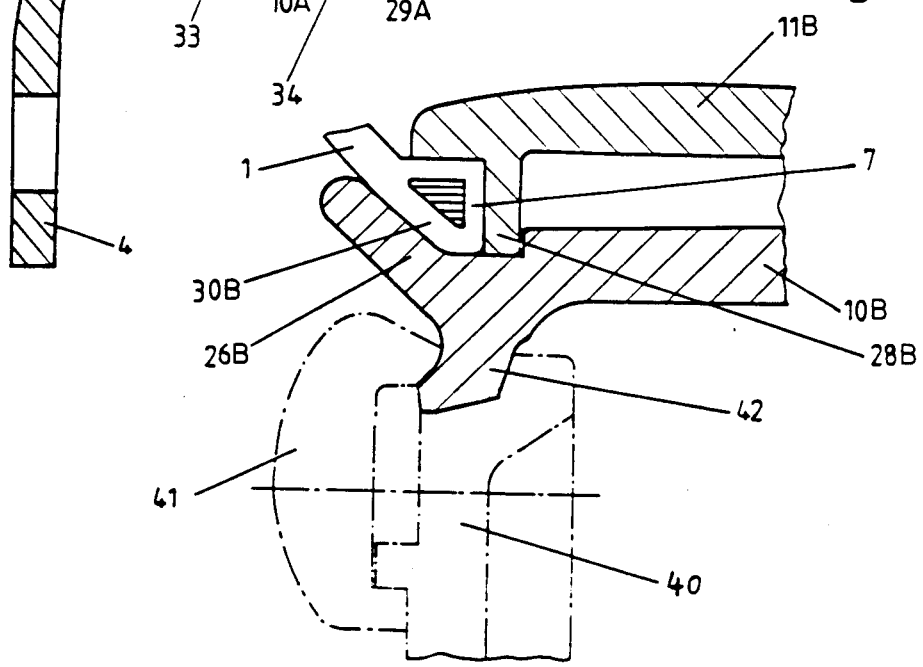

VEHICLE WHEEL

CROSS REFERENCE TO RELATED APPLICATION

This application is related to the commonly assigned, copending United States application Ser. No. 19,206, filed 2/26/87, and entitled "Disc Wheel For A Vehicle".

BACKGROUND OF THE INVENTION

The present invention relates to a new and improved construction of a vehicle wheel.

In its more specific aspects, the present invention relates to a new and improved construction of a vehicle wheel, especially although not exclusively for commercial vehicles. This vehicle wheel is equipped with a rim for mounting thereon a pneumatic tire whose tire beads are positioned at the radial inner circumference of an outer-situated or outer-lying rim part and each of these tire beads are retained in an associated groove of the rim. This rim is fixingly connected with an attachment or fastening flange.

Such type of vehicle wheel is known from the German Patent Publication No. 3,410,048, published Sept. 19, 1985, and cognate with U.S. Pat. No. 4,630,662, granted Dec. 23, 1986. With this vehicle wheel, for the mounting of the tire there are required, as viewed in cross-section, large recesses for the reception of the tire beads. Consequently, there are required clamping rings for the retention or holding of the tire beads. These clamping rings are held on centering seats of the rim with the aid of appropriate attachment or fastening means such as, for example, threaded bolts or screws or a snap ring. This rim design requires a great deal of technical knowledge about its construction and the exercise of great care when mounting the tire. The manufacture of such rims requires a large number of processing operations or steps and their production is very costly.

SUMMARY OF THE INVENTION

Therefore with the foregoing in mind it is a primary object of the present invention to provide a new and improved construction of a vehicle wheel for a vehicle tire which is not afflicted with the aforementioned drawbacks and shortcomings of the prior art construction.

Another important object of the present invention aims at the provision of an improved construction of a vehicle wheel of the aforementioned type, which does not possess the previously discussed disadvantages and with a weight-saving construction thereof that guarantees a secure retention or holding of the pneumatic tire, even when the vehicle wheel is used for heavy commercial vehicles, and wherein there is afforded an easy and simple mounting of the pneumatic tire notwithstanding the stiff bead cores which are present at the pneumatic tires of such type of vehicles.

Yet a further significant object of the present invention is directed to the provision of a new and improved construction of a vehicle wheel for mounting thereat a pneumatic tire, wherein the vehicle wheel is structured such that reliable and safe mounting of the tire at the vehicle wheel is possible in a relatively easy, safe and rapid manner, with a minimum of effort.

Now in order to implement these and still further objects of the invention which will become more readily apparent as the description proceeds, the vehicle wheel or wheel structure of the present invention is manifested by the features that the outer-situated or outer-lying rim part comprises an external, circumferentially closed rim which can be separately inserted into the pneumatic tire. Grooves for retaining or holding the tire beads are formed by this external ring and an internal rim ring. This internal rim ring together with the attachment or fastening flange is circumferentially separated or sub-divided and composed of three segments.

Through the inventive features described above, there is realized a construction of a vehicle wheel equipped with a beam-rim arrangement of the aforementioned type, with which there is ensured a trouble-free mounting and demounting of the tire rims without the need for any additional or extra clamping and fastening parts or components, even in the case of tire rims used with heavy commercial vehicle tires.

In accordance with a preferred exemplary embodiment, the vehicle wheel also exhibits good run flat characteristics or properties, i.e. in case of a breakdown, typically a flat or damaged tire, it can transmit torques by means of the form-locking connection between the external closed ring and the internal rim ring without being influenced by the state of the damaged tire.

BRIEF DESCRIPTION OF THE DRAWINGS

The invention will be better understood and objects other than those set forth above will become apparent when consideration is given to the following detailed description thereof. Such description makes reference to the annexed drawings wherein throughout the various figures of the drawings there have been generally used the same reference characters to denote the same or analogous components and wherein:

FIG. 2 illustrates a front view of the vehicle wheel depicted in FIG. 1 but without the pneumatic tire mounted thereat;

FIG. 3 illustrates a second exemplary embodiment of the vehicle wheel depicted in FIG. 1, again depicted in fragmentary radial section and showing part of the pneumatic tire mounted thereat; and FIG. 4 is a fragmentary cross-section of a vehicle wheel which is fastened on a wheel spider.

DETAILED DESCRIPTION OF THE PREFERRED EMBODIMENTS

Figure 1:
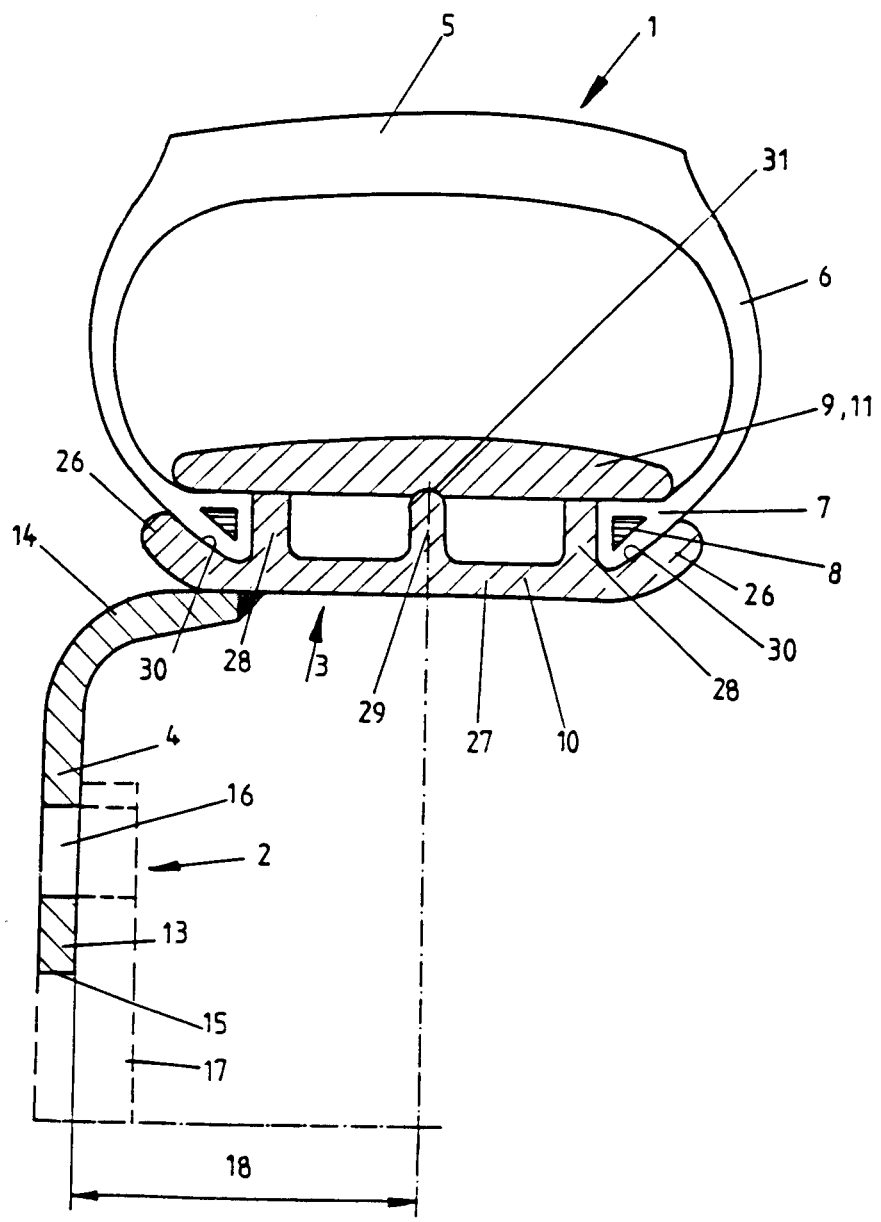
FIG. 1 is a fragmentary radial section of a vehicle wheel constructed as a disc wheel equipped with a rim and disc attached thereto and showing part of the pneumatic tire mounted thereat and used for commercial vehicles.

Describing now the drawings, it is to be understood that to simplify the showing thereof only enough of the structure of the inventive vehicle wheel or wheel structure has been illustrated therein as needed to enable one skilled in the art to readily understand the underlying principles and concepts of the present invention. Turning now specifically to FIGS. 1 and 2 of the drawings, there is depicted therein an exemplary embodiment of a vehicle wheel or wheel structure at which there can be mounted a pneumatic tire 1. This vehicle wheel or wheel structure contains a multi-part disc wheel 2. The multi-part disc wheel 2 is composed of a rim 3 and a disc 4. This pneumatic tire 1, made predominately from rubber or rubber-like plastics, possesses a tread 5 and two side walls 6. At each end of the two side walls, there is positioned a respective tire bead 7, and each of these two tire beads 7 possesses a tension-resistant or tension-proof bead core 8.

In the exemplary embodiment depicted, the tire beads or beads 7 exhibit a substantially triangular cross-section, but other constructions, for example, a round cross-section, are possible. The tire beads 7 of the pneumatic tire 1 are retained or held between an external or outer rim part 9 and an internal or inner rim ring 10 which form the rim 3. The external rim part 9 is constructed as an external circumferentially closed ring 11 which is separate from but engages the internal or inner rim ring 10 and which is separately insertable into the pneumatic tire 1. This external circumferentially closed ring 11 may be constructed as a radially deformable band which is stable or unyielding in the direction of the circumference thereof. The internal or inner rim ring 10 is appropriately fixedly connected, with the disc 4, but circumferentially divided together with this disc 4 into three segments 12a, 12b and 12c.

The disc 4 consists of a substantially planar or flat attachment or fastening flange 13 and a substantially arcuate-shaped transition or transition portion 14 merging with the internal rim ring 10. The attachment or fastening flange 13 possesses a centering bore 15 and bolt bore holes 16 positioned along a hole circle at substantially uniform pitch spacing or equidistantly from one another as shown in FIG. 2. The disc wheel 2 is centrally fastened to a wheel hub or a brake drum, as generally indicated by reference character 17, by means of conventional threaded bolts or the like, not shown. In the illustrated exemplary embodiment, the position of the attachment or fastening flange 13 is displaced to such an extent from the middle or central region of the rim 3 that the so-called inset 18 is greater than one-half the width of the rim 3.

The three disc wheel segments 12a, 12b and 12c are particularly clearly shown in FIG. 2, and they mutually contact one another in a form-locking manner at their separation or joint surfaces 19 and 20 at the region of the internal rim ring 10 in their finished mounted or assembled state. In the region of the disc 4, the further confronting and spaced separation or joint surfaces 21a and 21b of each two adjacent disc wheel segments 12a, 12b and 12c form a respective slot 22. Each such slot 22 extends from the circumferentially located separation or joint surfaces 19, 20 of the internal or inner rim ring 10 divided into three substantially identical or similar segments, depending upon the hole arrangement or pattern of the number of bore holes 16, inwardly either in a radial direction or at an angle α with respect to a radial line 23 up to the region of the centering bore 15. At the region of this centering bore 15 there are provided at the spaced separation surfaces 21a and 21b rounded or domed portions 24 for the reduction of stresses. Each slot 22 possesses a width 25 which is chosen to be such a size that for a problem-free mounting of the pneumatic tire 1, the disc wheel segments 12a, 12b and 12c can be pushed together circumferentially to such an extent that they can be sequentially inserted into the region defining the inner diameter of the pneumatic tire 1.

In the region of the bead seat or rim shoulder 26, the separation surfaces 19, 20 are constructed to possess a substantially V-shape or configuration with respect to each other, so that the disc wheel segments 12a, 12b and 12c, when assembled together, are fixedly interconnected in a form-locking manner in radial and axial directions, whereby the rim 3 and thus the multi-part disc wheel 2 are assembled to provide a self-supporting structure. The manner of interconnecting these three disc wheel segments 12a, 12b and 12c is well known in the art and the same has been disclosed by way of example in the commonly assigned Swiss Pat. No. 444,692, granted Sept. 30, 1967, to which reference may be readily had. Also of significance in this regard is the commonly assigned Swiss Pat. No. 324,960, granted Nov. 30, 1957, to which reference is also made.

As particularly clearly shown in FIG. 1, the internal or inner rim ring 10 exhibits two external, vertically or radially projecting or protruding webs 28 and a centrally arranged or central web 29 extending from the rim base 27. The external or outer circumferentially closed ring 11 rests with its inner circumference or surface on the external webs 28 and, in each case, forms a circular groove or pocket 30 with the webs 28 and the bead seats or rim shoulders 26, and in each of these grooves 30 a respective bead 7 is securely retained and pressed in position. The centrally arranged or central web 29 lies in a conforming recess 31 of the external or outer circumferentially closed ring 11, thus securing this external or outer ring 11 against lateral displacement. The webs 28 and 29 likewise possess the substantially V-shape arrangement of the separation or joint surfaces 19 and 20.

To mount the pneumatic tire 1 on the multi-part disc wheel or disc wheel 2, the external or outer circumferentially closed ring 11 is first inserted into the pneumatic tire 1 and then the three segments 12a, 12b and 12c are inserted into the region defining the inner diameter of the pneumatic tire 1, as already described with reference to FIG. 2. Then the three segments 12a, 12b and 12c are circumferentially displaced or slid such that the inner or internal rim ring parts, by virtue of the separating surfaces 19, 20 extending in a substantially V-shape, form a form-lockingly connected, closed, internal rim ring 10. With the introduction of compressed air through a further conventional and therefore not particularly depicted valve into the pneumatic tire 1 each bead 7 is tensioned against the clamping surfaces in the associated groove 30 and sealed in relation to the external or outer ring 11.

FIG. 3 shows a different construction from the embodiment of FIG. 1 of the external or outer circumferentially closed ring 11A and the internal or inner rim ring 10A. In this case, the webs 28A and 29A are arranged at the external ring 11A, whereby these then lie with their inner circumference or surface on the rim base 27A. The external circumferentially closed ring 11A is laterally held by the lateral ends 33 of ribs 32 arranged at the rim base 27A and the webs 28A. If the external or outer circumferentially closed ring 11A is constructed as a run flat ring, a circumferential displacement of this external or outer closed ring 11A in relation to the internal or inner rim ring 10A should be prevented. For this purpose, recesses 34 positioned in the central or centrally arranged web 29A and in which the ribs 32 come to lie, form a simple form-locking protection against torsion for the transfer of torques.

In the embodiment shown in FIG. 3, the disc 4 with the substantially arcuate-shaped, preferably parabolic, transition portion 14 is directly connected or merges with the end of the bead seat or rim shoulder 26.

In modified versions of both embodiments as illustrated in FIGS. 1 and 3 the internal or inner rim ring 10A or 10B, as the case may be, and the disc 4 can be made from sheet steel and appropriately fixedly connected such as by welding in order to form the disc wheel segments 12a, 12b and 12c.

FIG. 4 shows a fragmentary or partial cross-sectional view of a vehicle wheel which is fastened on a wheel spider 40 by means of clamping plates 41 and not particularly shown threaded bolts or screws. The internal or inner rim ring 10A is directly connected with an attachment or fastening flange 42. Centering and fastening of the fastening flange 42 on the wheel spider 40 corresponds to that on the known so-called Trilex wheels (see, for example, Swiss Pat. No. 175,208, granted Feb. 15, 1935). The separation or division of the internal or inner rim ring 10B with the attachment or fastening flange 42 into three segments exhibits separation or joint surfaces corresponding to the separation or joint surfaces 19, 20 extending in a substantially V-shape as shown in FIG. 2, so that in the same manner a form-locking connection is produced like the form-locking connection between the three segments 12a, 12b and 12c shown in FIG. 2. The construction of the external circumferentially closed ring 11B as well as the grooves or pockets 30B for the tire beads 7 of the pneumatic tire 1 otherwise correspond to the modified embodiment shown in FIG. 3.

However, the possibility also exists of constructing the internal or inner rim ring 10B and the external or outer ring 11B like the internal or inner rim ring 10 and the external or outer circumferentially closed ring 11 in the embodiment shown in FIG. 1.

With all exemplary embodiments, but particularly with the one shown in FIG. 1 and as previously explained, the external circumferentially closed ring 11 can be constructed as a band or hoop which is as stable or unyielding as possible in the direction of its circumference, but is radially deformable. For example, this can be achieved with a rubber, elastomer or plastic ring reinforced with circumferentially extending wires.

All embodiments of the three-part disc wheel or wheel structure can also be used for double tiring of vehicles in twin arrangement with discs or wheel spiders, as the case may be, directed towards or facing each other.

While there are shown and described present preferred embodiments of the invention, it is to be distinctly understood that the invention is not limited thereto, but may be otherwise variously embodied and practiced within the scope of the following claims. ACCORDINGLY,

What we claim is:

1. A vehicle wheel for mounting of a pneumatic tire having tire beads, particularly for commercial vehicles, comprising:
   a rim having an outer-situated rim part possessing a radially inner circumference against which bear the tire beads of the pneumatic tire;
   said rim being provided with a respective groove for receiving an associated tire bead of the pneumatic tire;
   said outer-situated rim part comprising an external, circumferentially closed ring,
   said rim further including an internal rim ring cooperating with said external circumferentially closed ring;
   said grooves being formed conjointly by said external circumferentially closed ring and said internal rim ring;
   said external circumferentially closed ring being separate from but engaging said internal rim ring and being separately insertable into said pneumatic tire;
   an attachment flange fixedly connected to said internal rim ring; and
   said internal rim ring together with said attachment flange being circumferentially separated and comprising three segments.

2. The vehicle wheel as defined in claim 1, wherein:
   said segments are arranged in circumferentially neighboring relationship to one another and defining adjacent each two neighboring segments, separation surfaces; and
   said separation surfaces of said segments in the region of said internal rim ring possessing a substantially V-shaped configuration in order to provide a mutual form-locking contact of said segments.

3. The vehicle wheel as defined in claim 2, wherein:
   said attachment flange comprises a disc provided with a centering bore;
   said separation surfaces of said segments being spaced at a predetermined distance from one another in the region of said disc to form slots;
   said slots extending from said internal rim ring to the region of said centering bore; and
   each said slot possesses a width dimensioned such that each of said segments can be pushed together to facilitate mounting of a pneumatic tire on the rim.

4. The vehicle wheel ad defined in claim 1, wherein:
   said internal rim ring possessing bead seats which extend substantial in conformity with the outer contour of the tire beads;
   a respective circumferentially extending substantially radially projecting web provided for reach groove and extending between said external circumferentially closed ring and said internal rim ring; and
   each said groove is formed by said external circumferentially closed ring, a respective one of said bead seats of said internal rim ring, and an associated one of said circumferentially extending substantially radially projecting webs.

5. The vehicle wheel as defined in claim 4, wherein:
   said circumferentially extending substantially radially projecting webs are arranged on said external circumferentially closed ring.

6. The vehicle wheel as defined in claim 4, wherein:
   said circumferentially extending substantially radially projecting webs are arranged on said internal rim ring.

7. The vehicle wheel as defined in claim 6, wherein:
   said internal rim ring has a central region;
   said external circumferentially closed ring possessing a recess;
   said internal rim ring possessing at said central region of the rim a circumferentially extending web means which engages in said recess of said external circumferentially closed ring; and
   said recess being configured in correspondence with said circumferentially extending web means for reception thereof.

8. The vehicle wheel as defined in claim 1, further including:
   means defining at least one form-locking connection for transferring torque and arranged between said internal rim ring and said separate external circumferentially closed ring; and said external circumferentially closed ring is constructed as a run flat ring.

9. The vehicle wheel as defined in claim 3, wherein:
said rim has a rim base; and
said disc is fixedly connected in the region of the rim base with said internal rim ring.

10. The vehicle wheel as defined in claim 3, wherein:
each segment of said internal rim ring has a bead seat containing an internal end as viewed in axial direction of the vehicle wheel; and
each segment of said disc being fixedly connected with an associated segment of said internal rim ring directly in the region of said internal end of said bead seat by a substantially arcuate-shaped transition portion.

11. The vehicle wheel as defined in claim 10, wherein:
said substantially arcuate-shaped transition portion possesses a substantially parabolic configuration.

12. The vehicle wheel as defined in claim 1, wherein:
said external circumferentially closed ring is constructed as a radially deformable band which is unyielding in the direction of the circumference thereof.

13. A vehicle wheel for mounting of a pneumatic tire having tire beads, particularly for commercial vehicles, comprising:
a rim having an outer-situated rim part;
said rim being provided with a respective groove for receiving an associated tire bead of the pneumatic tire;
said outer-situated rim part comprising an external ring;
said rim further including an internal rim ring cooperating with said external ring;
said grooves being formed conjointly by said external ring and said internal rim ring;
said external ring being separate from but engaging said internal rim ring and being separately insertable into said pneumatic tire;
an attachment flange fixedly connected to said internal rim ring; and
said internal rim ring together with said attachment flange being structured to define a segmented structure comprising a plurality of segments.

14. A vehicle wheel for mounting of a pneumatic tire having tire beads, particularly for commercial vehicles, comprising:
a rim having an outer-situated rim part;
said rim being provided with a respective groove for receiving an associated tire bead of the pneumatic tire;
said outer-situated rim part comprising an external ring;
said rim further including an internal rim ring cooperating with said external ring;
said grooves being formed conjointly by said external ring and said internal rim ring;
said external ring being separate from but engaging said internal rim ring and being separately insertable into said pneumatic tire;
said external ring is constructed as a radially deformable band which is unyielding in the direction of the circumference thereof;
an attachment flange fixedly connected to said internal rim ring; and
said internal rim ring together with said attachment flange being structured to define a segmented structure comprising a plurality of segments.

* * * * *